United States Patent [19]

Flaugher

[11] Patent Number: 5,509,857
[45] Date of Patent: Apr. 23, 1996

[54] CONSTANT VELOCITY UNIVERSAL JOINT

[75] Inventor: David C. Flaugher, Midland, Mich.

[73] Assignee: General Motors Corporation, Detroit, Mich.

[21] Appl. No.: 168,242

[22] Filed: Dec. 17, 1993

[51] Int. Cl.$^6$ ..................................................... F16D 3/224
[52] U.S. Cl. ............................................ 464/145; 464/906
[58] Field of Search ................................. 464/145, 144, 464/143, 906

[56] References Cited

U.S. PATENT DOCUMENTS

| | | |
|---|---|---|
| 1,916,442 | 7/1933 | Rzeppa. |
| 3,982,840 | 9/1976 | Grosseau ............................... 403/14 |
| 4,090,375 | 5/1978 | Takahashi et al.. |
| 4,156,353 | 5/1979 | Welschof ............................... 464/145 |
| 4,231,232 | 11/1980 | Otsuka et al. ...................... 464/906 X |
| 4,275,571 | 6/1981 | Welschof. |
| 4,319,465 | 3/1982 | Ito et al. .............................. 464/145 |
| 4,610,643 | 9/1986 | Krude ................................... 464/143 |
| 5,167,584 | 12/1992 | Krude ................................... 464/145 |

FOREIGN PATENT DOCUMENTS

| | | | |
|---|---|---|---|
| 2556608 | 7/1976 | Germany ............................ 464/145 |
| 126124 | 9/1980 | Japan ................................... 464/145 |

OTHER PUBLICATIONS

Fred F. Miller, "Constant Velocity Universal Ball Joints—Their Application In Wheel Drives", *Society of Automotive Engineers Paper No. 958A*, Jan. 1965.

*Primary Examiner*—Daniel P. Stodola
*Assistant Examiner*—Eileen A. Dunn
*Attorney, Agent, or Firm*—Saul Schwartz

[57] ABSTRACT

A non-stroking, constant velocity universal joint including a cup-shaped outer joint element having internal ball grooves, an inner joint element having external ball grooves, a cage between the inner and outer joint elements coacting with spherical inner and outer walls of the joint elements and having a plurality of ball apertures in register with the ball grooves, and a plurality of bearing balls in the ball apertures and ball grooves. A characterizing BCD/BD ratio greater than 3.5 is achieved in the constant velocity universal joint by providing notches on opposite sides of partitions on the outer joint element between the internal grooves from an open end of the outer joint element to the center of the inner spherical wall. The notches reduce the effective width of the partitions, which otherwise would exceed the width of the ball apertures in the cage due to the high BCD/BD ratio, to less than the width of the ball apertures.

2 Claims, 3 Drawing Sheets

CONSTANT VELOCITY UNIVERSAL JOINT

FIELD OF THE INVENTION

This invention relates to constant velocity universal joints.

BACKGROUND OF THE INVENTION

A non-stroking, constant velocity universal joint widely used in front wheel drive axles of motor vehicles includes a cup-shaped outer joint element having internal ball grooves in a spherical wall thereof separated by partitions, an inner joint element having external ball grooves in a spherical wall thereof, a cage between the inner and outer joint elements coacting with the spherical walls of each and having a plurality of ball apertures in register with the internal and external ball grooves, and a plurality of bearing balls in the ball apertures and ball grooves. For assembly, the cage is turned perpendicular to an open end of the outer joint element with a diametrically opposite pair of ball apertures aligned with a diametrically opposite pair of partitions. Because the outside dimension of the cage at the ball apertures is less than the inside dimension of the open end of the outer joint element between the partitions, the cage passes between the diametrically opposite partitions. Assembly in this manner, however, requires that the width of the ball apertures in the cage be greater than the width of the partitions.

A characterizing dimensional relationship of universal joints having the construction described above is the ratio of the bearing ball circle diameter ("BCD") to the bearing ball diameter ("BD") which, for motor vehicle from wheel drive universal joints, is typically in a range of between 3.1 and 3.5. Universal joints having higher BCD/BD ratios are attractive because the ball apertures in the cages of such joints are more widely spaced and the cages, consequently, are more durable. A consequence of increasing the BCD/BD ratio is that the joint becomes difficult to assemble because the width of the partitions on the outer joint element increases to greater than the width of the ball apertures in the cage. A universal joint according to this invention is assembled in the above described conventional manner but is characterized by a BCD/BD ratio exceeding 3.5.

SUMMARY OF THE INVENTION

This invention is a new and improved non-stroking, constant velocity universal joint including a cup-shaped outer joint element having internal ball grooves, an inner joint element having external ball grooves, a cage between the inner and outer joint elements coacting with spherical inner and outer walls of the joint elements and having a plurality of ball apertures in register with the ball grooves, and a plurality of bearing balls in the ball apertures and ball grooves. A characterizing BCD/BD ratio greater than 3.5 is achieved in the constant velocity universal joint according to this invention by providing notches on opposite sides of partitions between the internal grooves on the outer joint element from an open end thereof to the center of the inner spherical wall thereof. The notches reduce the effective width of the partitions, which otherwise would exceed the width of the ball apertures in the cage due to the high BCD/BD ratio, to less than the width of the ball apertures and extend into the outer joint element a distance sufficient for the geometric centers of the coacting spherical walls of the cage and outer joint element to achieve coincidence. When the cage is turned perpendicular to the open end of the outer joint element and advanced between the partitions, the notches afford clearance for the portions of the cage which would otherwise interfere with the partitions.

DESCRIPTION OF A PREFERRED EMBODIMENT

Figure 1:
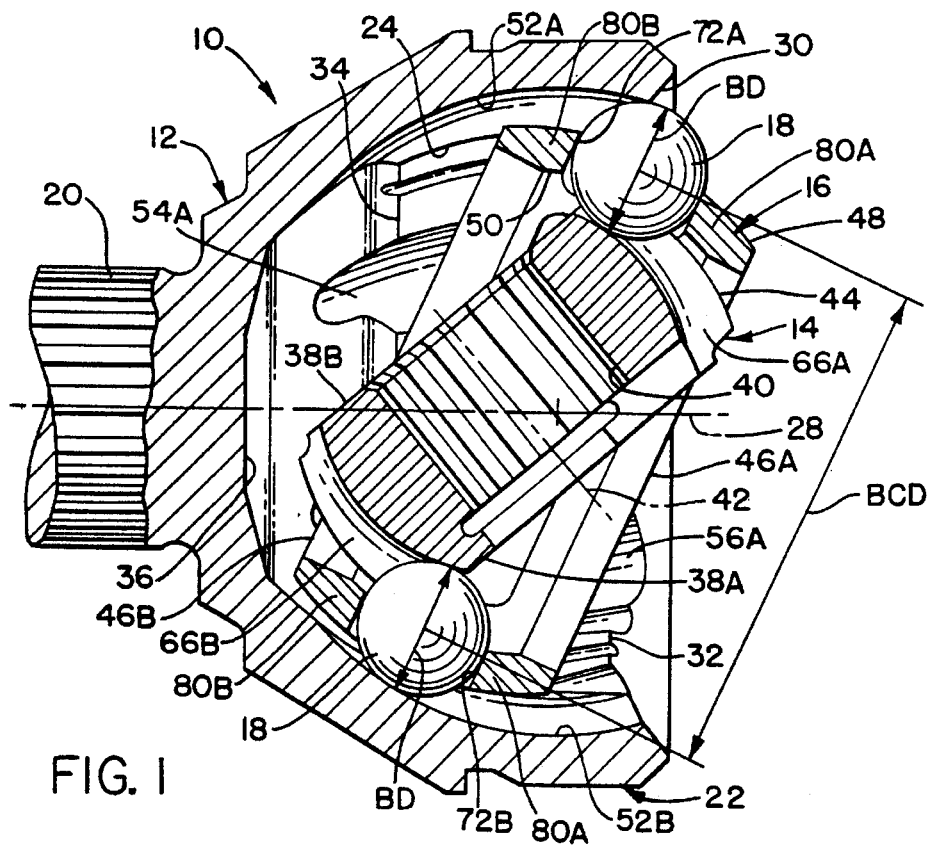
FIG. 1 is a sectional view of a constant velocity universal joint according to this invention taken generally along a longitudinal center plane of the joint.

Referring to the drawings, a non-stroking, constant velocity universal joint 10 according to this invention comprises an outer joint element 12, an inner joint element 14, a cage 16 between the inner and outer joint elements, and a plurality of spherical bearing balls 18. The outer joint element 12 includes a solid shaft 20 for attachment to a driven member, not shown, such as a driven wheel of a motor vehicle, and an integral cup 22. The cup 22 has an inner wall 24 defining a zone or segment of a sphere having a radius "R" from a geometric center 26 on a centerline 28 of the outer joint element. The inner wall 24 intersects a generally beveled open end 30 of the cup 22 at a front edge 32 and terminates at a back edge 34 spaced forward of a closed end 36 of the cup.

The inner joint element 14 is generally disc-shaped and includes a pair of flat sides 38A–B, a splined bore 40 symmetric about a centerline 42 of the inner joint element perpendicular to the flat sides 38A–B, and an outer wall 44 between the flat sides 38A–B defining a zone of a sphere. A splined end of a shaft, not shown, such as a drive shaft in a front wheel drive axle assembly of a motor vehicle, is received in the bore 40 whereby the shaft and the inner joint element are rotatable as a unit.

The cage 16 has a pair of side edges 46A–B, an outside surface 48 defining a zone of a sphere between the first and second side edges 46A–B, and an inside surface 50 also defining a zone of a sphere between the first and the second side edges 46A–B. The radius of the outside surface 48 is slightly smaller than the radius "R" of the inner wall 24 of the cup 22. The radius of inside surface 50 of the cage is slightly larger than the radius of the outer wall 44 of the inner joint element 14. The outside surface 48 of the cage slidably coacts with the inner wall 24 of the cup and the inside surface 50 slidably coacts with the outer wall 44 of the inner joint element in conventional constant velocity universal joint fashion.

Figure 2:
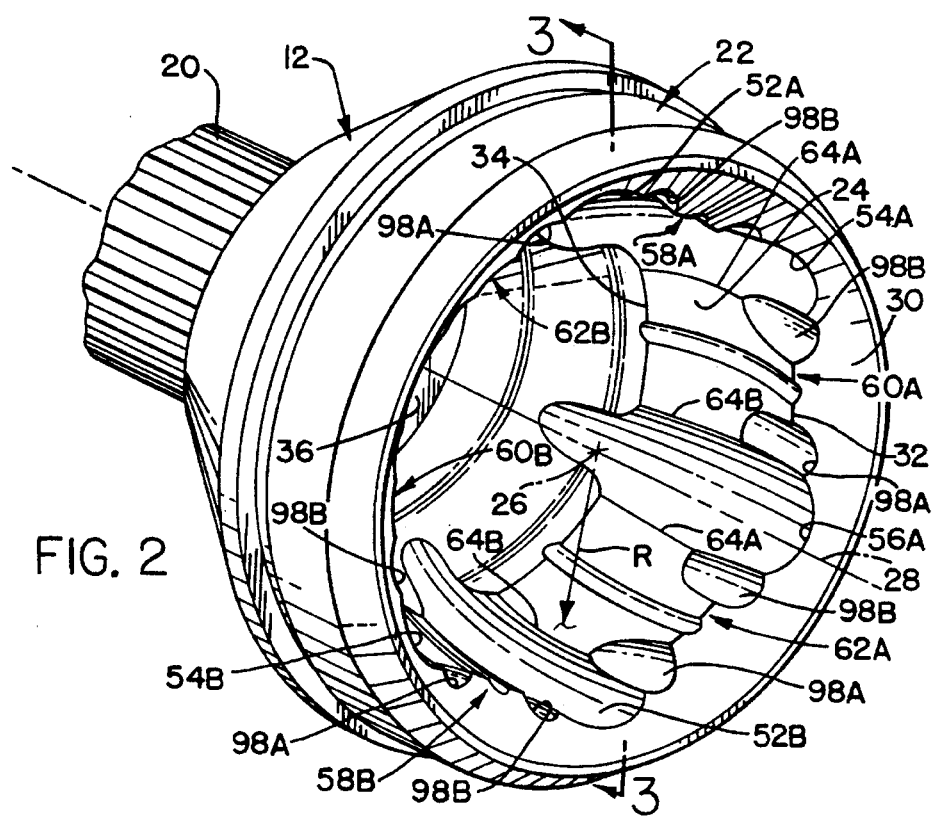
FIG. 2 is a fragmentary perspective view of an outer joint element of the constant velocity universal joint according to this invention.
Figure 3:
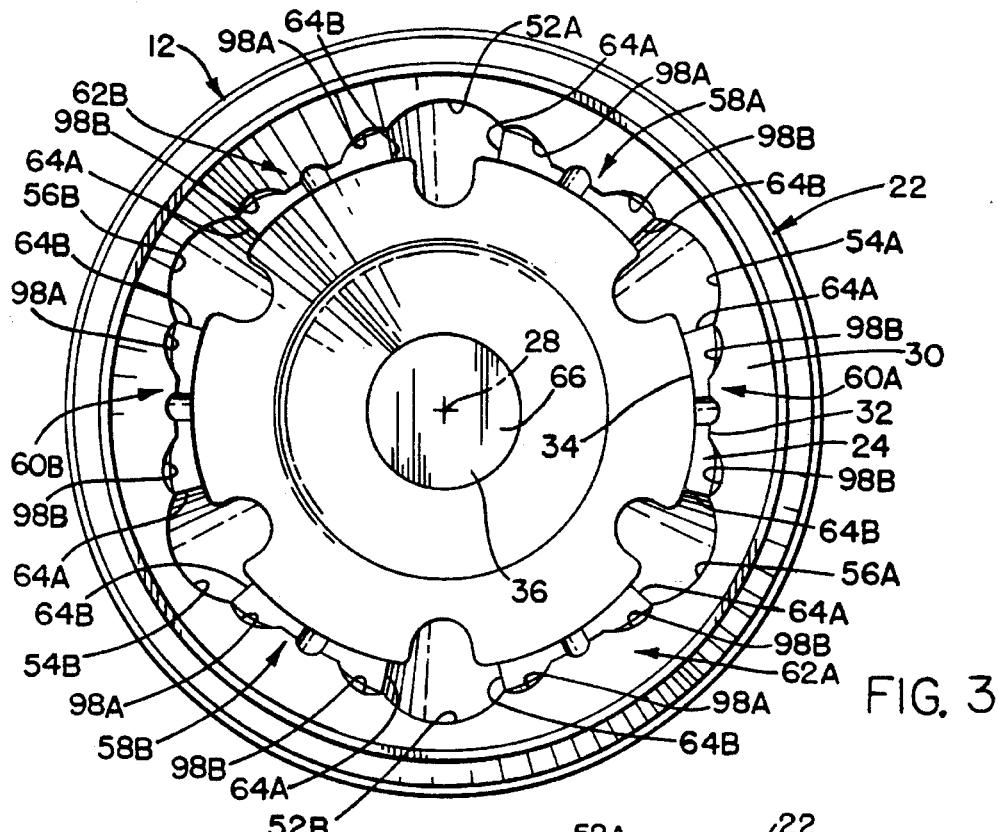
FIG. 3 is a view taken generally along the plane indicated by lines 3—3 in FIG. 2.

As seen best in FIGS. 2–3, three symmetrically arrayed, diametrically opposite pairs of internal toroidal ball grooves 52A–B, 54A–B and 56A–B are formed in the inner wall 24 of the cup 22. The internal grooves extend between the front and back edges 32,34 and are generally semi-circular in a plane perpendicular to the centerline 28. The geometric center of the internal grooves is shifted relative to the geometric center 26 of the inner wall 24 so that the internal grooves are more shallow near the back edge 34 than near the front edge 32. The portions of the cup 22 between the internal grooves define three symmetrically arrayed, diametrically opposite pairs of partitions 58A–B, 60A–B and 62A–B extending between the front and back edges 32,34. Each of the partitions is bounded on opposite longitudinal sides by a pair of corners 64A–B defined at the intersection of the inner wall 24 and the two internal grooves flanking each partition.

Figure 5:
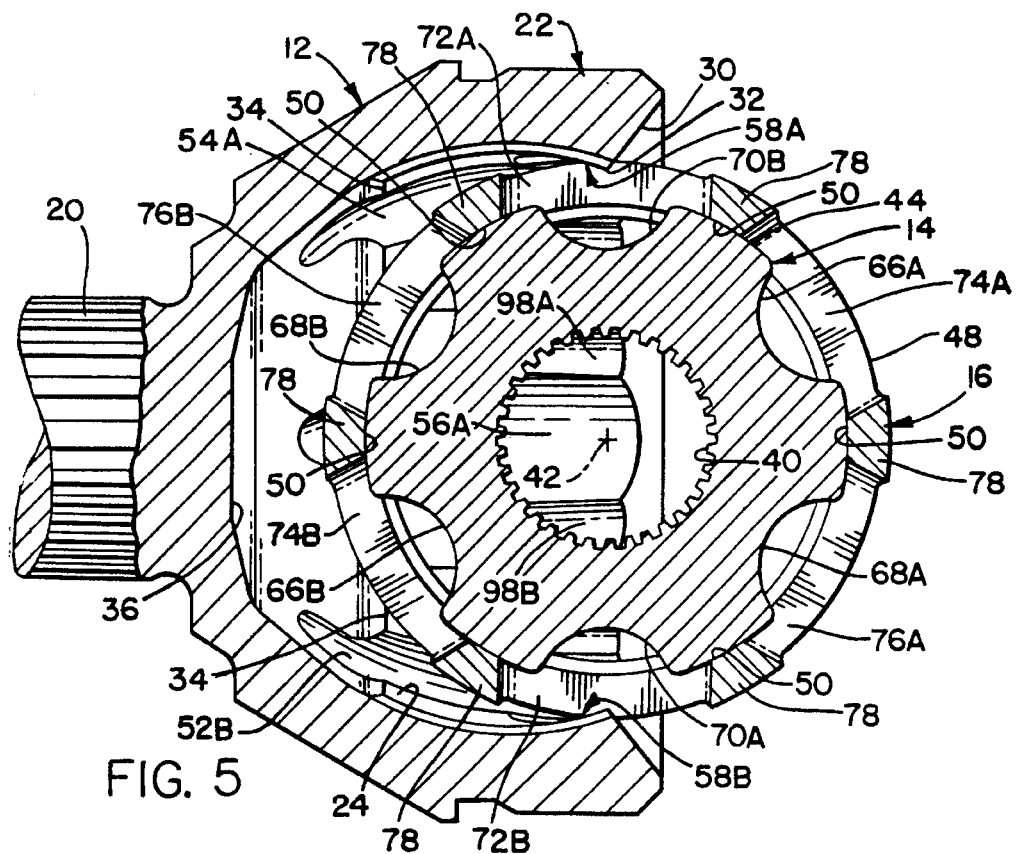
FIG. 5 is a sectional view taken generally along the plane indicated by lines 5—5 in FIG. 4.

As seen best in FIGS. 1 and 5, three symmetrically arrayed, diametrically opposite pairs of external toroidal ball grooves 66A–B, 68A–B and 70A–B are formed in the outer wall 44 of the inner joint element 14. The external grooves extend between the flat sides 38A–B and are semi-circular in a plane perpendicular to the centerline 42.

Figure 4:
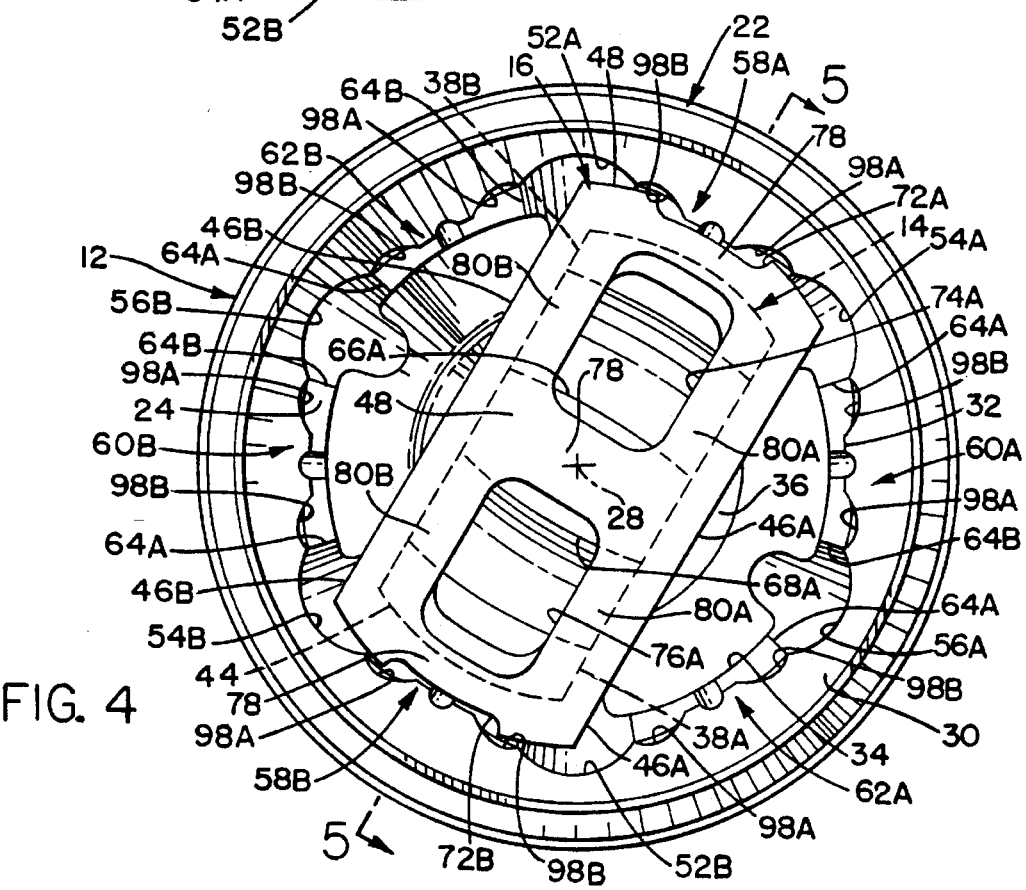
FIG. 4 is similar to FIG. 3 but illustrating assembly of the constant velocity universal joint according to this invention.

As seen best in FIGS. 1,4 and 5, three symmetrically arrayed, diametrically opposite pairs of rectangular ball apertures 72A–B, 74A–B and 76A–B are formed in the cage 16. The portions of the cage between the ball apertures define a plurality of circumferential webs 78 of the cage. The portions of the cage between the ball apertures and the first and second side edges 46A–B define a plurality of axial webs 80A–B of the cage.

The bearing balls are disposed in the ball apertures in the cage and in aligned pairs of internal and external ball grooves. In conventional constant velocity universal joint fashion, the bearing balls transfer torque from the drive shaft connected to the inner joint element 14 to the shaft 20 of the outer joint element 12 while accommodating angular displacement between the centerlines 28,42.

Each of the bearing balls 18 has a ball diameter "BD", FIG. 1. The locus of the geometric centers of the bearing balls in the joint assembly form a circle having a ball circle diameter "BCD", FIG. 1. In motor vehicle front wheel drive axles, constant velocity universal joints of the construction described above and characterized by a BCD/BD ratio in a range of between about 3.1 and 3.5 are common. In an otherwise substantially comparable constant velocity universal joint, a characterizing BCD/BD ratio greater than 3.5 is desirable because the circumferential webs 78 of the cage in such a joint are wider, and the cage is, therefore, more durable.

A consequence of increasing the characterizing BCD/BD ratio in an otherwise comparable constant velocity universal joint may be described with reference to a prior art non-stroking, constant velocity universal joint 82, FIG. 6. The prior art universal joint 82 includes a cup 84 corresponding to the cup 22 of the universal joint 10 according to this invention having an open end 86 and a plurality of internal ball grooves 88 separated by a plurality of partitions 90. The prior art universal joint 82 further includes a cage 92 corresponding to the cage 16 of the universal joint 10 according to this invention having a plurality of ball apertures 94 and a plurality of axial webs 96.

Figure 6:
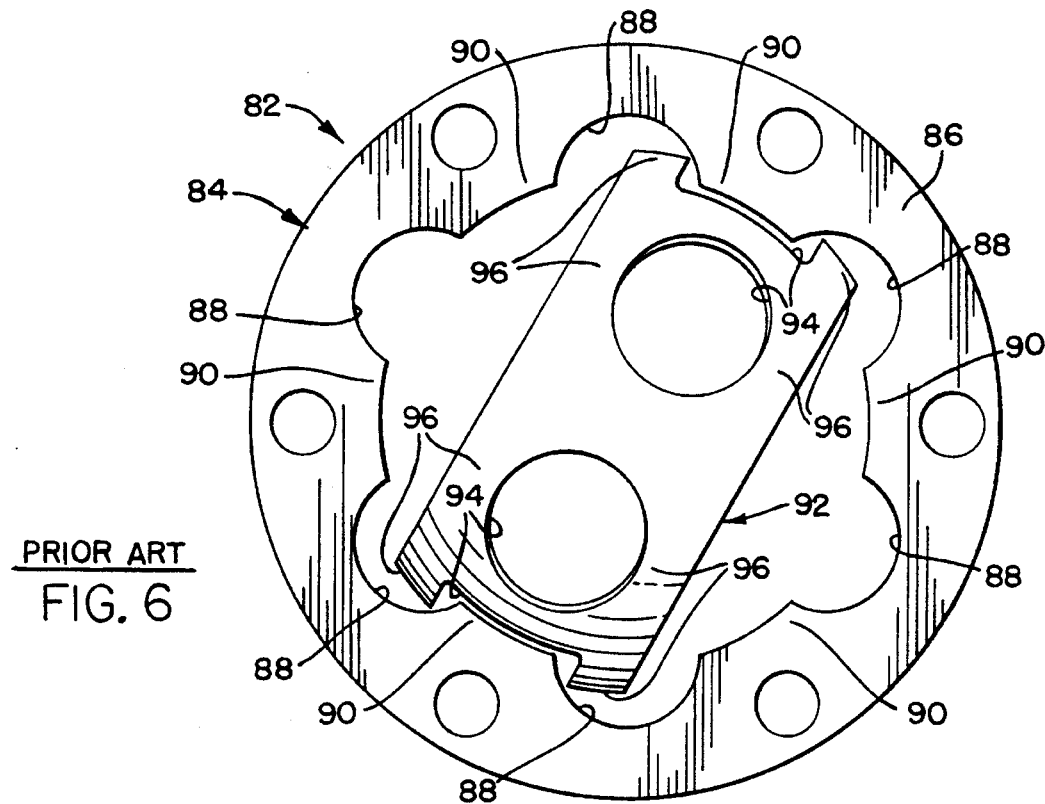
FIG. 6 is similar to FIG. 4 but illustrating assembly of a prior art constant velocity universal joint.

For assembly, the cage 92 is turned perpendicular to the open end 86 of the cup 84, FIG. 6, and rotated until a diametrically opposite pair of ball apertures 94 registers with a diametrically opposite pair of partitions 90. The internal span between the partitions 90 exceeds the span between the planes of the diametrically opposite pair of ball apertures 94 so that the cage may be advanced into the cup between the partitions. If, however, the characterizing BCD/BD ratio of the universal joint 82 is increased, for example, by decreasing BD, the width of the ball apertures 94 decreases and the length of the partitions 90 increases so that penetration of the cage 92 into the cup 84 is prevented by interference between the partitions 90 and the axial webs 96 of the cage.

As seen best in FIGS. 2–5, the universal joint 10 according to this invention, characterized by a BCD/BD ratio greater than 3.5 but otherwise dimensionally comparable to the prior art universal joint 82, is adapted for assembly in the conventional fashion described above. More particularly, each partition 58A–B, 60A–B and 62A–B on the outer joint element 12 has a pair of reliefs or notches 98A–B on opposites sides thereof. Each notch extends from the front edge 32 of the inner wall 24 to a trailing edge at the centerplane of the inner wall 24 perpendicular to centerline 28 where the notch feathers into the inner wall. Each of the notches 98A–B removes from the outer joint element a corresponding wedge of material whereat the axial webs 80A–B of the cage 16 would otherwise interfere with the partitions.

For assembly, the cage 16 of the universal joint 10 according to this invention is turned perpendicular to the open end 30 of the cup 22 and rotated until, for example, the diametrically opposite pair of ball apertures 72A–B registers with the diametrically opposite pair of partitions 58A–B. As the cage 16 is then advanced into the cup, the ball apertures 72A–B pass between the partitions 58A–B and the corresponding axial webs 80A–B of the cage traverse respective ones of the notches 98A–B on opposite sides of the partitions 58A–B. When the geometric center of the outside surface 48 of the cage achieves coincidence with the geometric center 26 of the inner wall 24 of the cup, the cage is turned about ninety degrees to effect capture of the cage in the inner wall in the usual fashion.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. A non-stroking constant velocity universal joint comprising:

an outer joint element having a cup with an open end symmetric about a longitudinal centerline of said outer joint element, a spherical inner wall terminating at a front edge at said open end of said cup, a plurality of internal ball grooves in said inner wall, and a plurality of partitions separating said internal ball grooves; a cage having a pair of side edges, a spherical outside surface between said edges adapted for disposition in and slidable coaction with said spherical inner wall of said cup, and a plurality of ball apertures for register with said internal ball grooves separated on opposite sides from said pair of side edges by a pair of axial webs of said cage; and means defining a pair of notches in said inner wall on opposite sides of a selected one of said plurality of partitions extending from said front edge to a centerplane of said inner wall perpendicular to said longitudinal centerline of said outer joint element for providing clearance for said pair of axial webs on opposite sides of said selected one of said plurality of ball apertures in said cage so that pair of axial webs do not obstruct translation of said cage into said cup.

2. The constant velocity universal joint recited in the claim 1 wherein:

said outer joint element includes an even number of said plurality of internal ball grooves arrayed in diametrically opposite pairs and a corresponding even number of said plurality of partitions between said internal ball grooves arrayed in diametrically opposite pairs, said selected one of said plurality of partitions constitutes one half of a diametrically opposite pair of said plurality of partitions, and said constant velocity universal joint further includes, a second pair of notches in said inner wall on opposite sides of a second one of said plurality of partitions constituting a second half of said diametrically opposite pair of said plurality of partitions extending from said front edge to said centerplane of said spherical inner wall.

* * * * *